United States Patent
Mason et al.

(10) Patent No.: US 11,370,591 B2
(45) Date of Patent: Jun. 28, 2022

(54) SEED PRESERVATION AND STORAGE CONTAINER

(71) Applicant: 1000 Springs Mill, LLC, Buhl, ID (US)

(72) Inventors: Kurt J. Mason, Buhl, ID (US); Timothy J. Cornie, Buhl, ID (US); Abra D. Snow, Twin Falls, ID (US)

(73) Assignee: 1000 Springs Mill, LLC, Buhl, ID (US)

( * ) Notice: Subject to any disclaimer, the term of this patent is extended or adjusted under 35 U.S.C. 154(b) by 0 days.

(21) Appl. No.: 16/875,875

(22) Filed: May 15, 2020

(65) Prior Publication Data

US 2020/0361691 A1 Nov. 19, 2020

Related U.S. Application Data (60) Provisional application No. 62/849,210, filed on May 17, 2019.

(51) Int. Cl.
*B65D 81/18* (2006.01)
*B65D 85/00* (2006.01)

(52) U.S. Cl.
CPC ............. *B65D 81/18* (2013.01); *B65D 85/70* (2013.01)

(58) Field of Classification Search
CPC ........ B65D 43/16; B65D 51/28; B65D 81/18; B65D 85/70; B65D 85/00
USPC ........................................ 206/459.5; 229/93
See application file for complete search history.

(56) References Cited

U.S. PATENT DOCUMENTS

| | | | | |
|---|---|---|---|---|
| 168,367 A | * | 10/1875 | Boies | B29C 53/48 229/93 |
| 722,881 A | * | 3/1903 | Paine | B65D 3/04 229/93 |
| 3,621,994 A | * | 11/1971 | Brown | B65D 81/02 206/446 |
| 5,337,894 A | * | 8/1994 | Ivey | B01L 9/06 206/370 |
| 5,375,716 A | * | 12/1994 | Rubin | B01L 9/06 206/443 |
| 5,427,743 A | * | 6/1995 | Markin | B01L 9/06 206/446 |

(Continued)

FOREIGN PATENT DOCUMENTS

KR 2017010261 A * 1/2017 ............. B65D 25/20

*Primary Examiner* — Bryon P Gehman
(74) *Attorney, Agent, or Firm* — Richard D. Clarke (57) ABSTRACT

The present application is directed to Seed Preservation and Storage Containers and a process for preserving and long term storing of a wide variety of crop seeds, plant seeds, heirloom seeds, flowering plant seeds, tree seeds, and grains including corn, beans, peas and rice. Each long term storage and preservation container will be labeled with the container seed contents information on QR codes or bar codes, in and on containers, and the seed packets stored within the containers. By using a method of preservation and storage for an extended period of time, seed containers will be processed resulting in an ultimate climate condition to prevent the seeds within the seed containers from molding, rotting or prematurely germinating for many years. Contents of the seed containers will be readily revealed by scanning the outside labels on the containers and on the individual seed packet labels within the containers.

24 Claims, 4 Drawing Sheets

(56) References Cited

U.S. PATENT DOCUMENTS

| | | | | |
|---|---|---|---|---|
| 5,993,745 | A * | 11/1999 | Laska | B01L 9/06 |
| | | | | 206/446 |
| 8,240,494 | B1 * | 8/2012 | Mohns | A01C 15/006 |
| | | | | 220/1.5 |
| 8,302,768 | B2 * | 11/2012 | Sibley | F42B 39/24 |
| | | | | 206/3 |
| 8,727,220 | B2 * | 5/2014 | Key | G09F 3/0297 |
| | | | | 235/462.01 |
| 8,863,947 | B2 * | 10/2014 | Sibley | B65D 17/4011 |
| | | | | 206/213.1 |
| 9,878,821 | B2 * | 1/2018 | Sibley | B65D 17/34 |
| 9,902,511 | B2 * | 2/2018 | Minvielle | A23P 10/00 |
| 10,207,859 | B2 * | 2/2019 | Minvielle | A23P 10/00 |
| 2014/0069838 | A1 * | 3/2014 | Minvielle | B65D 85/00 |
| | | | | 53/411 |
| 2016/0060021 | A1 * | 3/2016 | Lau | B65D 85/52 |
| | | | | 206/223 |
| 2016/0267416 | A1 * | 9/2016 | Hodges | G06Q 10/0833 |

* cited by examiner

SEED PRESERVATION AND STORAGE CONTAINER

FIELD OF THE INVENTION

This invention relates to the field of storing a wide variety of plant seeds and grain including corn, beans, peas, flowering plants, and rice information in a unique container and method of storage resulting in an ultimate climate condition to prevent them from molding or germination.

BACKGROUND OF THE INVENTION

The Seed Preservation and Storage Containers described within this application will protect the ancient seeds, also known as heirloom seeds, from molding or germination. Seeds can only be stored for 3 years if stored and processed in a "cool, dark place" and seeds are still losing 50% or more of the germination, the process by which an organism grows. Most seeds in a seed bank are stored in glass Mason jars, plastic packaging, paper, bags, or gunny sacks. By keeping seeds cool at 40 degrees Fahrenheit (F) or lower and dry 8-10% relative humidity or lower, their drive to germinate can be repressed. An adequate long-term sealing method requires the evacuating of the air and moisture in the container, by pulling a vacuum, and replacing with an inert gas, such as nitrogen, or carbon dioxide before sealing of the container. Seed storage system described by the Seed Preservation and Storage Containers application will maintain 8-10% humidity by taking all the moisture, humidity, and oxygen out of the can leaving the seeds to be stored in the ultimate climate condition. The moisture will be removed by the means of vacuum, diatomaceous earth filters or other conventional moisture reduction processes.

Seeds are being stored in "Seed Banks" all around the globe in conditions that are not suitable for the seed to protect the germination of the seed due to extreme fluctuation of light, and relative humidity. Even with a little humidity the seed will begin the germination process or mold. The only seed storage devices that are commonly used just eliminate oxygen by putting seeds into a glass jar to preserve them or in an enclosed polyethylene bag that is light sensitive.

Numerous innovations for Seed Preservation and Storage Containers have been provided in the prior art that art described as follows. Even though these innovations may be suitable for the specific individual purposes to which they address, they differ from the present invention as hereinafter contrasted. The following is a summary of those prior patents most relevant to the invention at hand, as well as a description outlining the difference between the features of the present invention and those of the prior art.

US Patent Application Publication No. US 2005/0160669 A1 of Peter J. Shortridge et al. describes a method of creating and preserving the identity of non-GMO seeds, grains, and processed food products by selecting seeds which are known to contain non-GMO varieties, planting the non-GMO crop, inspecting grower's operation and machinery to certify that the operation is free of contamination prior to harvest, harvesting the crop, inspecting the processing facility to verify that its operation is free of contamination prior to harvest, tracking all containers holding non-GMO crops each time the crop is moved, and processing the non-GMO crops into containers for shipment where the containers possess tracking information.

This patent describes a method of creating and preserving the identity of non-GMO seeds, grains, and processed food products but does not identify a specific method for extended long term storage in the seed banks as the present Seed Preservation and Storage Containers application.

US Patent Application Publication No. US 018/0253995 A1 of Daniel L. Amend describes a seed pack, plant seed and marker system and related apparatus and method, comprising: a seed pack; a plurality of plant seeds contained within the seed pack; identifying information pertaining to the plant seeds printed on an outside surface of the seed pack; growing guidelines pertaining to the plant seeds printed on the outside surface of the seed pack; a plurality of preprinted seed markers integrally packaged together with the seed pack and the seeds; at least some of the identifying information pertaining to the seeds also preprinted on the preprinted seed markers; and at least some of the growing guidelines pertaining to the seeds also preprinted on the preprinted seed markers.

This patent describes a seed pack, plant seed and marker system and related apparatus and method but cannot be applied to long term preservation and storage device and process used in the Seed Preservation and Storage Containers application.

US Patent Application Publication No. US 2018/0362213 A1 of Jan M. Van Den Kieboom et al. describes a combination shipping and display package for relatively small articles, especially gift items such as candy and other food, small green plants, young tree seedlings, or flowering plants. The package is designed to be lightweight, to protect the article being shipped, and to function as an adornment after delivery. The package includes a container for the article to be shipped, a stand for supporting the container, and a cap for covering the stand. The stand is collapsible into a flat shape and is expandable into an open upright shape for displaying the shipped article. The stand may also have printed matter thereon to provide a message or advertisement. When a plant is being shipped, the package may include a water-resistant breathable bag surrounding the container to help contain the seed or root ball of the plant during shipment, and to provide an additional ornamental feature for the plant when displayed.

This patent describes a combination shipping and display package for relatively small articles but cannot be applied to the long term preservation, and storage device and process used in the Seed Preservation and Storage Containers application.

U.S. Pat. No. 7,320,409 B2 of Jonathan Stagnetto describes a palletizable container for preserving and transporting, in a controlled atmosphere and under a controlled pressure, produce (plant material, cheese, microorganisms, seeds, substrates, etc.) requiring a particular atmosphere during storage, the container comprising a first portion that is completely impermeable to gas and vapor and a second portion in the final of a member controlling the flow of gas and vapor between the inside of said container and the outside, the first portion comprising a rigid bottom element, intermediate elements in the form of a case having an open upper portion and an openwork bottom, and a cover element, including connection means for fastening and providing a seal between a lower element and an immediately superior element, and the second portion being integrated into the bottom element.

This patent describes a pallet device for storing and transporting produce such as fruits and vegetables in a semi-controlled environment and could not be used for the long term preservation and storage of such fruits and vegetables and seeds of any kind, as the device and process used in the Seed Preservation and Storage Containers application.

U.S. Pat. No. 6,758,341 B1 of Robert H. Johnson describes a seed envelope includes an aperture covered by a transparent sheet. The aperture is particularly spaced from the bottom and two sides of the envelope. The aperture allows the purchaser to view the seeds which fill at least a portion of the seed envelope. In order to incorporate the transparent sheet, the envelope must be filled from the top, away from the transparent sheet and aperture.

This patent describes a seed envelope that includes an aperture covered by a transparent sheet but again cannot be applied to the long term preservation and storage device and process used in the Seed Preservation and Storage Containers application.

In this respect, before explaining at least one embodiment of the Seed Preservation and Storage Containers in detail it is to be understood that the Seed Preservation and Storage Containers is not limited in its application to the details of construction and to the arrangement, of the components set forth in the following description or illustrated in the drawings. The Seed Preservation and Storage Containers is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for designing of other structures, methods and systems for carrying out the several purposes of the present application. It is important, therefore, that the claims be regarded as including such equivalent construction insofar as they do not depart from the spirit and scope of the present application.

SUMMARY OF THE INVENTION

The primary advantage of the Seed Preservation and Storage Containers is for storing seeds for an extended longer period of time than is presently used and preserving seeds from molding or rot, and not having them germinate prematurely.

Another advantage of the Seed Preservation and Storage Containers is to protect the seeds from the detrimental effects of oxygen, light and moisture by using the hermetically sealing process, and flooding the container with an inert gas such as nitrogen or carbon dioxide.

Another advantage of the Seed Preservation and Storage Containers is that they will be used additionally for the storage of a wide variety of seeds including but not limited to varietal seeds, vegetable seeds, fruit seeds, flower seeds, heirloom seeds, tree seeds, grain seeds, corn seeds, bean seeds, pea seeds and rice seeds.

Another advantage is the Seed Preservation and Storage Containers holding the seeds will be identified on the outside by the means of a QR code label, bar code label or virtual reality (VR) label for identifying large amounts of data, including but not limited to plant descriptions, habitat, origin, date canned, germination rate, approximate number of seeds, purity of seeds, inert matter, net weight, variety, average moisture, photographs, and a USDA Zone Map.

Another advantage is the Seed Preservation and Storage Containers holding the seeds can have a paper packet of information on the inside with large amounts of data including plant descriptions, habitat, origin, date canned, germination rate, approximate number of seeds, purity of seeds, inert matter, net weight, variety, average moisture, photographs, and a USDA Zone Map.

Another advantage is the tubing holding the seeds can be additionally numerically identified within the Seed Preservation and Storage Containers.

Another advantage of the Seed Preservation and Storage Containers is that the preservation and storage containers and process is relatively inexpensive compared to other more complicated processes for accomplishing the same result.

Another advantage is the storage devices are enamel coated on the inside and outside and may be in a variety of different sizes and shapes.

Another advantage of the Seed Preservation and Storage Containers is that separate straws may contain small amounts of similar or related products.

Another advantage of the Seed Preservation and Storage Containers is that the inside of the containers may be divided into a variety of separate compartments, and these compartments may be constructed of paper, plastic and other biodegradable materials.

Another advantage is that the Seed Preservation and Storage Containers may have a liner insert to further prevent the degradation of the outer container and these liners may be constructed of paper, plastic and other biodegradable materials.

The preferred method of hermetically sealed seed container is to use a heavy gauge double enameling that is used in the canning industry to describe a steel can that has been manufactured with enamel coating on all surfaces of the can. The enamel is to prevent rusting on inside and outside of the can. Before seeds are inserted into the can, the seeds may be first placed into plastic seed tubes of various sizes. The gas permeable plastic tubes are numerically identified and heat sealed at one end to eliminate losing or wasting seeds during packing and shipping. In addition to being constructed of metal, the containers may be constructed of plastic, glass, composites, and other biodegradable materials.

The tubes then are inserted into a circular disk with orifices for the plastic seed tubes. Rice cake can be inserted at the top or bottom of the plastic seed tubes. The plastic seed tubes may be vacuum heat sealed at the top. An inert atmosphere is desired where the container is placed into a vacuum chamber and approximately 28" of mercury is drawn on the chamber which removes all oxygen atmospheric moisture that is present. The vacuum is halted and the chamber is then flooded with gaseous nitrogen. Seed Preservation and Storage Containers will have a Quick Response (QR) code identifying what is in each tube and on the outside of the container including plant descriptions, habitat, origin and photographs where possible. The Quick Response system became popular outside the automotive industry due to its fast readability and greater storage capacity compared to standard UPC barcodes. Applications include product tracking, item identification, time tracking, document management, and general marketing.

If a dehumidified inert atmosphere is desired within the container, the seed container is placed into a vacuum chamber and approximately 28" of mercury is drawn (also known as "pulling a vacuum") on that vacuum chamber which removes all oxygen and atmospheric moisture that is present. When the vacuum chamber is drawn or pulled down to approximately 28" of mercury, the moisture is vaporized and the chamber contents cool to below freezing. The vacuum pull is then halted and the vacuum chamber is then flooded with gaseous nitrogen, or any other inert gas or carbon dioxide gas desired for long term seed preservation and storage.

The gas is inert and dry creating a caring atmosphere inside the container and around the seeds, creating inside the container which eliminates the degradation of the seeds. The shelf life storage time will give the seeds an unlimited life regardless of environment outside the container. This application is not limited to gaseous nitrogen. Other methods that can be used are liquid nitrogen, oxygen absorbers along with other inert gasses such as carbon dioxide, helium and argon. Any process used to create inert/caring atmosphere while canning the seeds will be covered within the scope of the application. The can is then taken out of the chamber and then transported to a seamer and a lid is applied.

As required, the detailed embodiments of the present The Seed Preservation and Storage Containers application is directed to storing a wide variety of plant seeds and grain including corn, beans, peas and rice along with their information on QR codes or bar codes in and on containers using a unique method of storage for an extended period of time resulting in an ultimate climate condition to prevent them from molding or germination for many years are disclosed herein, however, it is to be understood that the disclosed embodiments are merely exemplary of the design that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure as well as combination.

These together with other advantages of the Seed Preservation and Storage Containers, along with the various features of novelty, which characterize the design are pointed out with particularity in the claims annexed to and forming a part of this disclosure. For a better understanding of the Seed Preservation and Storage Containers its operating advantages and the specific objects attained by its uses, reference should be made to the accompanying drawings and descriptive matter in which there are illustrated the preferred and alternate embodiments of the Seed Preservation and Storage Containers. There has thus been outlined, rather broadly, the more important features of the design in order that the detailed description thereof that follows may be better understood, and in order that the present contribution to the art may be better appreciated. There are additional features of the Seed Preservation and Storage Containers that will be described hereinafter, and which will form the subject matter of the claims appended hereto.

With respect to the above description then, it is to be realized that the optimum dimensional relationships for the parts of the Seed Preservation and Storage Containers to include variations in size, materials, shape, form, function and manner of operation, assembly and use, are deemed readily apparent and obvious to one skilled in the art, and all equivalent relationships to those illustrated in the drawings and described in the specification are intended to be encompassed by the present design. Therefore, the foregoing is considered as illustrative only of the principles of the Seed Preservation and Storage Containers. Further, since numerous modifications and changes will readily occur to those skilled in the art, it is not desired to limit the Seed Preservation and Storage Containers to the exact construction and operation shown and described, and accordingly, all suitable modifications and equivalents may be resorted to falling within the scope of this application.

BRIEF DESCRIPTION OF THE DRAWINGS

The accompanying drawings, which are incorporated in and form a part of this specification, illustrate embodiments of the Seed Preservation and Storage Containers and together with the description, serve to explain the principles of this application.

DETAILED DESCRIPTION OF THE PREFERRED EMBODIMENTS

As required, the detailed embodiments of the present Seed Preservation and Storage Container 10A, 10B, 10C, 10D and 10E are disclosed herein, however, it is to be understood that the disclosed embodiments are merely exemplary of the design that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure as well as combination.

The primary features will include as prominent design and operational features: a container comprising a pop-top sealed can or a screw top sealed can, a screw top bucket or pail, a screw top barrel or drum, wherein that container has a liner, inner support brackets, and spacer inserts, configured to contain seeds in bulk, in straws and in paper packets of varying sizes and shapes.

Figures 1, 2, 3:
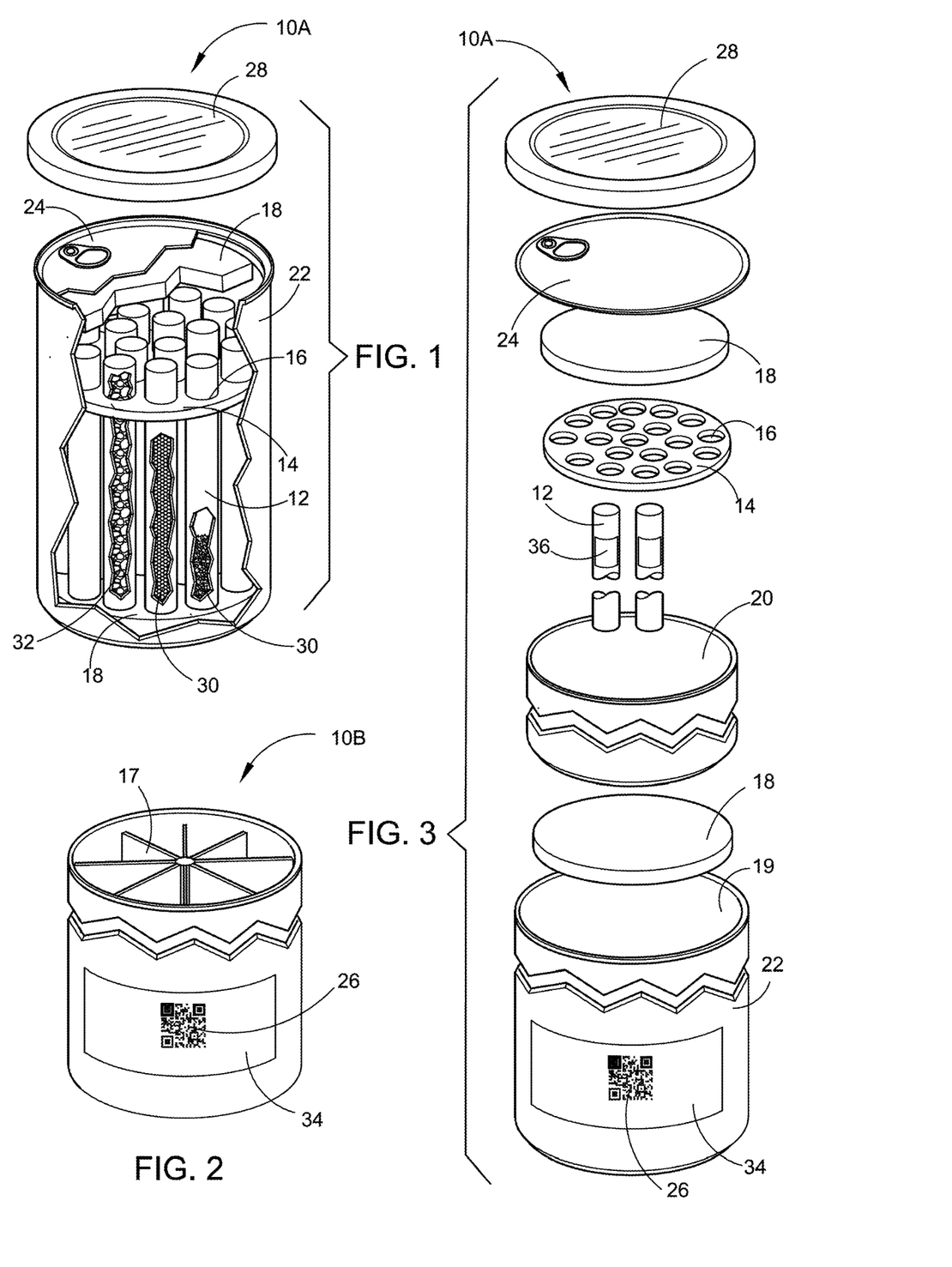
FIG. 1 depicts a cut-away perspective view of a Seed Preservation and Storage Containers illustrating the contents.
FIG. 2 depicts a sectioned version of the Seed Preservation and Storage Container with the QR code identifier on the side.
FIG. 3 depicts an exploded perspective view of a Seed Preservation and Storage Containers.

FIG. 1 depicts a cutaway perspective view of a Seed Preservation and Storage Containers 10A illustrating the locations of the straws or tubes 12 held in place by the means of one or more inner support disks 14 with a plurality of matching orifices 16 to secure the items. Rice cake disks 18 will be at the top and bottom of the straws or tubes 12 within the outer Seed Preservation and Storage Container 22. A pop-top can lid 24 shown is commonly used but a variety of other types of conventional sealing methods may be used and still remain within the scope of this application. The outer Seed Preservation and Storage Container 22 that is optionally enamel coated on the inside and outside has been shown with a plurality of straw tubes 12. These straw tubes can be made of gas permeable polymer plastics, such as low density polyethylene (LDPE), high density polyethylene (HDPE) and polypropylene, and the like. These polymer plastic materials are gas permeable to nitrogen, oxygen and carbon dioxide. The straws 12 can also be made from paper materials, also gas permeable. Three of the straw or tubes 12 have been broken away to expose the seeds 30 and grains 32 stored on the inside. It is anticipated that the Seed Preservation and Storage Containers will be used for the storage and preservation of a wide variety of seeds including but not limited to varietal seeds, vegetable seeds, fruit seeds, flower seeds, heirloom seeds, tree seeds, grain seeds, corn seeds, bean seeds, pea seeds and rice seeds.

FIG. 2 depicts a sectioned version of the Seed Preservation and Storage Container 10B with the QR code identifier 26 identifying large amounts of data including plant descriptions, habitat, origin and photographs on the outside label 34. In this illustration of a divided can, an inner divider insert 17 has 8 compartments in which to store bulk seeds of varying types. It is anticipated that these dividers could define any number of compartments from 2 up to 16, or more. Outside label 34 can be a simple printed label, a bar code label, a QR code 26 label, as shown, or a label containing a microchip.

FIG. 3 depicts an exploded perspective view of a Seed Preservation and Storage Containers 10A illustrating the conventional plastic lid 28 shown above the pop-top can lid 24 and the upper rice cake disk 18. The inner support disks 14 with a plurality of matching orifices 16 used to secure the items is shown above the straws or tubes 12 shown with identifying inside individual straw labels 36 above the optional liner insert 20 with enamel coating 19 on the inside and outside. A second rice cake 18 will be at the bottom of the Seed Preservation and Storage Container 22 with the QR code identifier 26 on the outside label 34 on the side. Each of the straws 12 within the container 22 will be individually labeled with inside straw labels 36.

Figure 4:
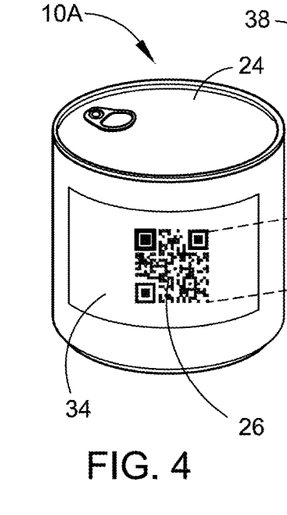
FIG. 4 depicts a sealed Seed Preservation and Storage Container with a QR code identifier on the side.

FIG. 4 depicts a sealed Seed Preservation and Storage Container 10A with pop-top lid 24 and a QR code identifier 26 on the outside label 34. The information on the QR code identifier 26 may be viewed and scanned by an individual holding a mobile device, such as a smartphone 38 (see FIG. 5). Once the smartphone 38 scans the QR code 26, it appears on the mobile device screen display 40 and directs the user to a web-based computer implemented database to identify the contents of the container 10A. This process of identification of the sealed container seed contents is facilitated by a mobile device application (APP) 42 which is further explained in FIG. 6.

Figure 5:
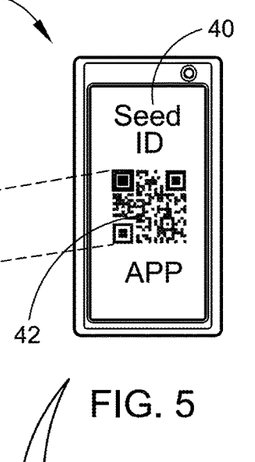
FIG. 5 depicts a conventional smartphone with a QR code identifier on the display surface.

FIG. 5 depicts a smartphone 38 with QR code identifier APP 40 which scans QR code 26 placed on container outside label 34 and reads information 44 regarding the contents of the Seed Preservation and Storage Container 10A on the mobile device screen display 40 on the smartphone 38. Once the smartphone 38 scans the QR code 26, it appears on the mobile device screen display 40 and directs the user to a web-based computer implemented database 56 (see FIG. 7) to identify the contents of the container 10A. This process of identification of the sealed container seed contents is facilitated by a mobile device application (APP) 42 scanning the QR code on the container label 44, which is further explained in FIG. 6. It is anticipated that in addition to a QR code reader, or bar code scanner, that a virtual reality (VR) system may be employed to scan and read the electronically readable labels adhered to the Seed Preservation and Storage Containers, as configured in accordance to the present invention.

Figure 6:
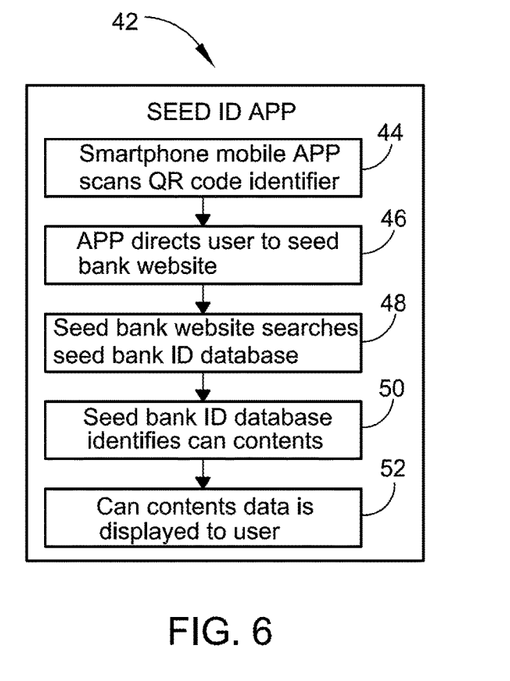
FIG. 6 depicts a seed Identification APP process steps chart.

FIG. 6 depicts the seed identification APP 42 used to reveal the seed contents information stored on the QR code identifier 26. The seed ID APP 42 is a mobile application on a mobile device such as a smartphone 38, capable of scanning 44 a QR code identifier 26 and the APP 42, then directs user to seed bank website 46. Next the seed bank website 46 searches a web-based computer-implemented seed bank ID database 48 and then the seed bank identifies all of the container contents 50. The container contents data is then displayed to user 52 typically on a website page displayed on the mobile device screen display 40. All container contents (each straw or packet of seeds) are displayed in an organized manner on a website database page (see FIG. 7). The QR code can be replaced by an externally mounted microchip (not shown).

Figure 7:
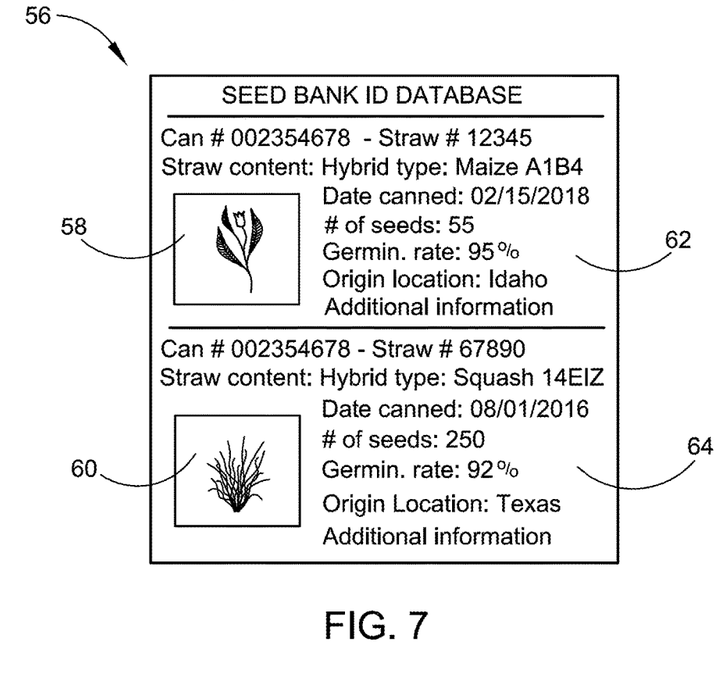
FIG. 7 depicts a seed bank identification database diagram.

FIG. 7 depicts an example of a displayed seed bank identification database website page 56 where the photographs 58 and 60 are separately described within the data information blocks 62 and 64. The information 62 and 64 may be displayed by container (can) number, straw (or paper packet) number for straws (or packets) located inside the identified container, providing information on each type of seed therein, such as hybrid type, date the seed was canned, the number of seeds within each straw, the germination rate of the seeds within each straw, the origin location of the seeds within the straw, and additional information as required by the user of the seed preservation and storage containers, described in this application. The seeds within each container will be identified on the outside by the means of a QR code label, bar code label or virtual reality (VR) label for identifying large amounts of data, including but not limited to plant descriptions, habitat, origin, date canned, germination rate, approximate number of seeds, purity of seeds, inert matter, net weight, variety, average moisture, photographs, and a USDA Zone Map. Additionally, photographs of the actual plants 58 and 60 where the contained seeds were gathered, can be displayed on the website page alongside the seed information 62 and 64, as shown here in FIG. 7.

Figure 8:
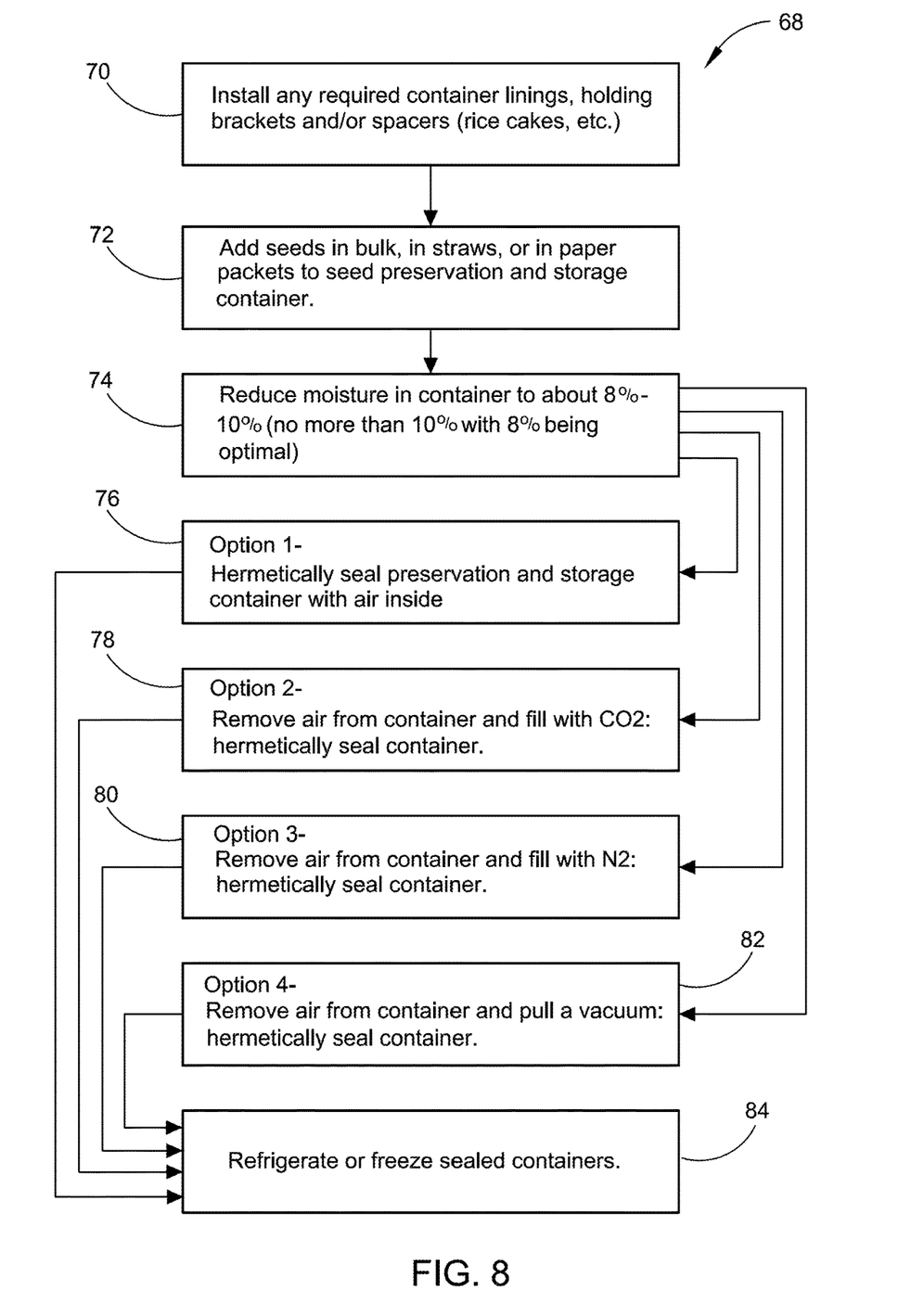
FIG. 8 depicts a Seed Preservation and Storage Containers a canning process flow chart.

FIG. 8 depicts a Seed Preservation and Storage Containers canning process flow chart and block diagram 68 illustrating the four basic steps and the four optional steps of the seed preservation and storage process.

STEP 1—Install any required seed preservation and storage container linings, holding brackets and/or spacers (rice cakes, etc.) 70.

STEP 2—Add seeds in bulk, in straws, or in paper packets to seed preservation and storage container 72.

STEP 3—Reduce moisture in seed preservation and storage container to about 8%-10% (no more than 10% with 8% being optimal) 74.

STEP 4—Option 1—hermetically seal seed preservation and storage container with only dehumidified atmospheric air inside 76.

STEP 5—Option 2—remove air from dehumidified container and fill with CO2; hermetically seal seed preservation and storage container 78.

STEP 6—Option 3—remove air from dehumidified container and fill with N2; hermetically seal seed preservation and storage container 80.

STEP 7—Option 4—remove air from dehumidified container and pull a vacuum; hermetically seal seed preservation and storage container 82.

STEP 8—Refrigerate or freeze sealed seed preservation and storage container 84.

Figure 9:
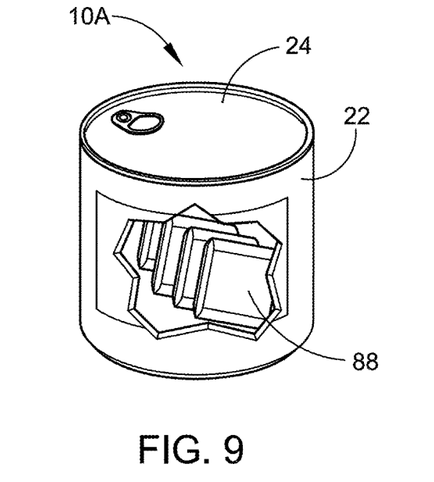
FIG. 9 depicts a Seed Preservation and Storage Container pop-top can with the side cut away illustrating seed packets on the inside.

FIG. 9 depicts a Seed Preservation and Storage Container 10A having a pop-top can lid 24 with the side of the can 22 cut away illustrating seed packets 88 on the inside. Seed packets 88 may be made of paper and take the form of sugar paper rectangular packets, or paper straw elongated packets. The paper seed packets will have an exterior label to identify the seeds within.

Figure 10:
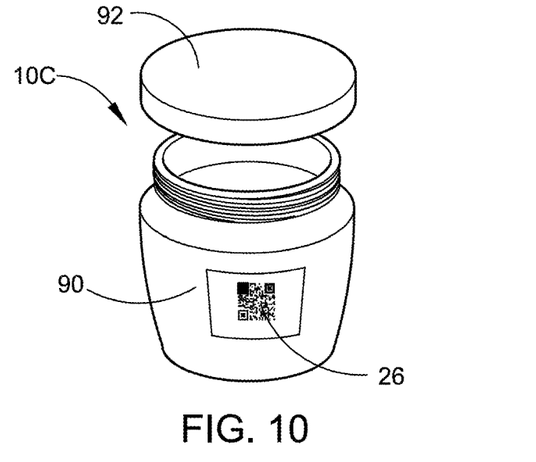
FIG. 10 depicts a threaded jar for a Seed Preservation and Storage Container.

FIG. 10 depicts a threaded jar 90 version of a Seed Preservation and Storage Container 10C with the threaded lid 92. The can container 90 can be of any size and configuration and will have a screw top lid 92, as shown.

Figure 11:
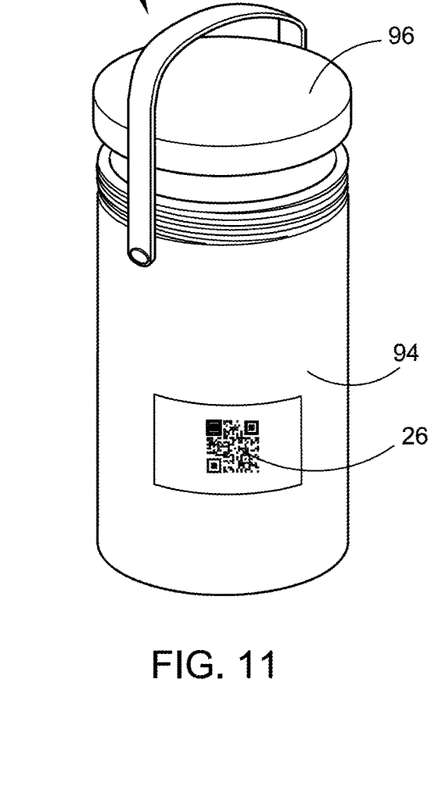
FIG. 11 depicts a bucket to be used for a Seed Preservation and Storage Container.

FIG. 11 depicts bucket 94 version of the Seed Preservation and Storage Containers 10D with the threaded lid 96. The pail or bucket 94 may be a conventional 5 gallon pail and will have a screw top lid 96, as shown. In addition to being constructed of metal, the containers may be constructed of plastic, glass, composites, and other biodegradable materials.

Figure 12:
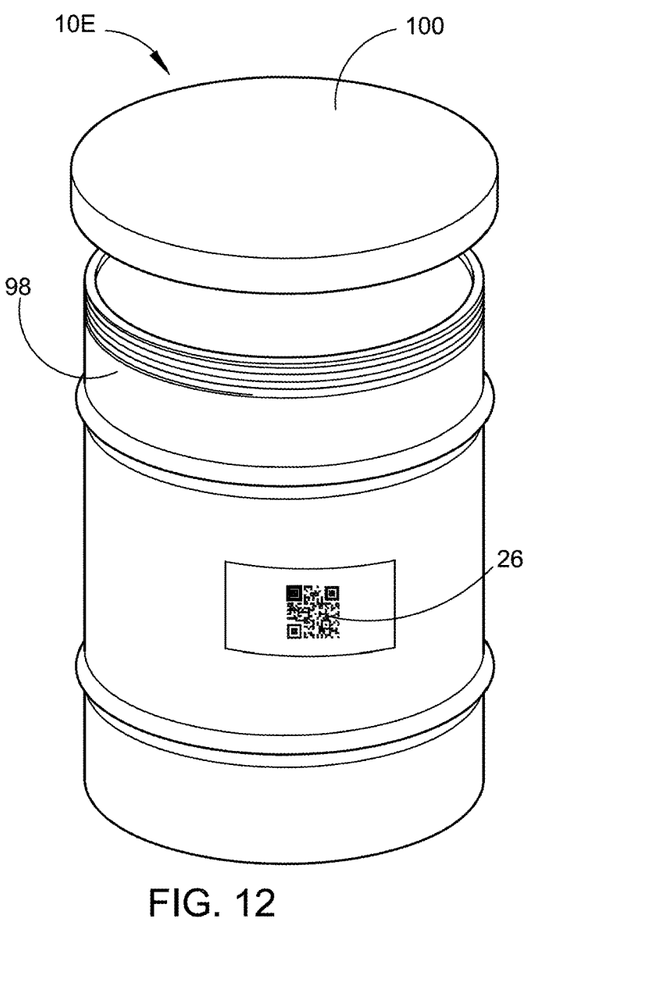
FIG. 12 depicts a barrel to be used for a Seed Preservation and Storage.

FIG. 12 depicts a conventional barrel 98 to be used for a Seed Preservation and Storage Container 10E. The barrel 98 may be a barrel or drum of large capacity such as a 50 gallon drum, and it will have a screw top lid 100 as shown. In addition to being constructed of metal, the containers may be constructed of plastic, glass, composites, and other biodegradable materials.

As required, the detailed embodiments of the present Seed Preservation and Storage Container 10A, 10B, 10C, 10D and 10E shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing the Seed Preservation and Storage Container 10A, 10B, 10C, 10D and 10E in accordance with the spirit of this disclosure, and such changes, alternations and modifications as would occur to those skilled in the art are considered to be within the scope of this design as broadly defined in the appended claims.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection, is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Further, the purpose of the foregoing abstract is to enable the U.S. Patent and Trademark Office, foreign patent offices worldwide and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. A seed preservation and storage container, comprising:
   (a) a container having a top section, a bottom section, an interior portion and an exterior portion, an inner surface, and an outer surface;
   (b) a support structure located in said interior portion configured for accepting, separating, and securing a plurality of seeds;
   (c) a plurality of seeds secured within said support structure;
   (d) an electronically readable container label affixed to said outer surface wherein said electronically readable container label is readable using a seed identification smartphone application in communication with a seed bank identification database for the purpose of accessing information regarding the contents of said container having said electronically readable container label affixed thereto; and
   (e) a lid configured to fit on said top section of said container;
   wherein the moisture content within said container is reduced to about 8%-10% relative humidity, and said container is hermetically sealed, long term preservation and long term storage within said container is enabled.

2. The seed preservation and storage container according to claim 1, wherein said support structure includes an inner support circular disk having a plurality of orifices therein.

3. The seed preservation and storage container according to claim 2, wherein said plurality of seeds is placed within seed straws and said seed straws are placed within the orifices in said inner support circular disk, and further wherein said seed straws include individual electronically readable labels affixed thereto.

4. The seed preservation and storage container according to claim 1, wherein said support structure includes a divider insert having two or more compartments, and said plurality of seeds is placed in bulk in said two or more compartments.

5. The seed preservation and storage container according to claim 1, wherein said electronically readable label includes one of a QR code identifier, a bar code label and a virtual reality readable label.

6. The seed preservation and storage container according to claim 1, further including a seed identification smartphone application, and a seed bank identification database, accessible through said seed identification smartphone application, wherein said seed identification database stores information regarding the contents of containers as identified by said electronically readable container labels.

7. The seed preservation and storage container according to claim 6, wherein said seed identification smartphone application is configured to scan and read said electronically readable label, direct a user to a seed bank website wherein a seed bank database is accessed, searches said accessed seed bank identification database, identifies the seed contents within the container, and displays said stored seed identification information regarding the seed contents.

8. The seed preservation and storage container according to claim 1, wherein said container has the air removed and is filled with an inert gas before being hermetically sealed for long term preservation and storage.

9. The seed preservation and storage container according to claim 1, wherein said lid includes a pop top easy open lid and a plastic lid for use after the container is opened by removal of the pop top easy open lid.

10. The seed preservation and storage container according to claim 1, wherein said support structure includes seed packs, seed packets and envelops.

11. The seed preservation and storage container according to claim 1, wherein said electronically readable container label affixed to said outer surface further includes a label capable of being read by a seed identification smartphone application, and further wherein said seed identification smartphone application is capable of accessing a seed bank identification database, wherein said seed identification database stores information regarding the contents of containers as identified by said electronically readable container labels.

12. The seed preservation and storage container according to claim 11, wherein said seed identification smartphone application is configured to scan and read said electronically readable label, then directs a user to a seed bank website wherein a seed bank database is accessed, searches said accessed seed bank identification database, identifies the seed contents within the container, and displays said stored seed identification information regarding the seed contents.

13. A method for making a seed preservation and storage container, comprising the steps of:
   (a) providing a container having a top section, a bottom section, an interior portion and an exterior portion, an inner surface, and an outer surface;
   (b) providing a support structure located in said interior portion configured for accepting, separating, and securing a plurality of seeds;
   (c) providing a plurality of seeds secured within said support structure;
   (d) providing an electronically readable container label affixed to said outer surface wherein said electronically readable container label is readable using a seed identification smartphone application in communication with a seed bank identification database for the purpose of accessing information regarding the contents of said container having said electronically readable container label affixed thereto;

(e) providing a lid configured to fit on said top section of said container;

(f) reducing the moisture content within said container to about 8%-10% relative humidity; and (g) hermetically sealing said container;

wherein the moisture content within said container is reduced to about 8%-10% relative humidity, and said container is hermetically sealed, long term preservation and long term storage within said container is enabled.

14. The method for making a seed preservation and storage container according to claim 13, wherein said support structure includes an inner support circular disk having a plurality of orifices therein.

15. The method for making a seed preservation and storage container according to claim 14, wherein said plurality of seeds is placed within seed straws and said seed straws are placed within the orifices in said inner support circular disk, and further wherein said seed straws include individual electronically readable labels affixed thereto.

16. The method for making a seed preservation and storage container according to claim 13, wherein said support structure includes a divider insert having two or more compartments, and said plurality of seeds is placed in bulk in said two or more compartments.

17. The method for making a seed preservation and storage container according to claim 13, wherein said electronically readable label includes one of a QR code identifier, a bar code label and a virtual reality readable label.

18. The method for making a seed preservation and storage container according to claim 13, further including a seed identification smartphone application, and a seed bank identification database, accessible through said seed identification smartphone application, wherein said seed identification database stores information regarding the contents of containers as identified by said electronically readable container labels.

19. The method for making a seed preservation and storage container according to claim 18, wherein said seed identification smartphone application is configured to scan and read said electronically readable label, direct a user to a seed bank website wherein a seed bank database is accessed, searches said accessed seed bank identification database, identifies the seed contents within the container, and displays said stored seed identification information regarding the seed contents.

20. The method for making a seed preservation and storage container according to claim 13, wherein said container has the air removed and is filled with an inert gas before being hermetically sealed for long term preservation and storage.

21. The method for making a seed preservation and storage container according to claim 13, wherein said lid includes a pop top easy open lid and a plastic lid for use after the container is opened by removal of the pop top easy open lid.

22. The method for making a seed preservation and storage container according to claim 13, wherein said electronically readable container label affixed to said outer surface further includes a label capable of being read by a seed identification smartphone application, and further wherein said seed identification smartphone application is capable of accessing a seed bank identification database, wherein said seed identification database stores information regarding the contents of containers as identified by said electronically readable container labels.

23. The method for making a seed preservation and storage container according to claim 22, wherein said seed identification smartphone application is configured to scan and read said electronically readable label, then directs a user to a seed bank website wherein a seed bank database is accessed, searches said accessed seed bank identification database, identifies the seed contents within the container, and displays said stored seed identification information regarding the seed contents.

24. A method for long term seed preservation and storage, comprising the steps of:

(a) STEP 1—providing a seed preservation and storage container including container linings, inner support structures and spacers;

(b) STEP 2—adding seeds in one of seeds in bulk, seeds in seed straws, and seeds in paper packets to said seed preservation and storage container;

(c) STEP 3—reducing the moisture content in said seed preservation and storage container to about 8%-10% relative humidity for long term seed preservation and storage;

(d) STEP 4—Option 1—hermetically sealing said seed preservation and storage container with the existing air inside; or Option 2—removing the air from said preservation and storage container and filling same with CO2 before hermetically sealing said container; or Option 3—removing the air from said container and filling same with N2 before hermetically sealing said container; or Option 4—removing the air from said container and pulling a vacuum before hermetically sealing container; and (e) STEP 5—refrigerating or freezing said hermetically sealed containers.

* * * * *